(12) United States Patent
Quan et al.

(10) Patent No.: US 9,052,826 B2
(45) Date of Patent: Jun. 9, 2015

(54) SELECTING STORAGE LOCATIONS FOR STORING DATA BASED ON STORAGE LOCATION ATTRIBUTES AND DATA USAGE STATISTICS

(75) Inventors: Gary Quan, La Cresenta, CA (US); Basil Thomas, Sylmar, CA (US); Craig Jensen, Clearwater, FL (US)

(73) Assignee: CONDUSIV TECHNOLOGIES CORPORATION, Burbank, CA (US)

( * ) Notice: Subject to any disclaimer, the term of this patent is extended or adjusted under 35 U.S.C. 154(b) by 0 days.

(21) Appl. No.: 12/984,553

(22) Filed: Jan. 4, 2011

(65) Prior Publication Data

US 2011/0167230 A1 Jul. 7, 2011

Related U.S. Application Data

(63) Continuation-in-part of application No. 12/349,457, filed on Jan. 6, 2009, and a continuation-in-part of application No. 11/495,184, filed on Jul. 28, 2006, now Pat. No. 7,870,128, application No. 12/984,553, filed on Jan. 4, 2011, which is a continuation-in-part of application No. 12/971,835, filed on Dec. 17, 2010, which is a continuation-in-part of application No. 11/495,184, filed on Jul. 28, 2006, now Pat. No. 7,870,128.

(60) Provisional application No. 61/020,361, filed on Jan. 10, 2008.

(51) Int. Cl.
*G06F 7/00* (2006.01)
*G06F 17/30* (2006.01)
*G06F 3/06* (2006.01)

(52) U.S. Cl.
CPC .............. *G06F 3/061* (2013.01); *G06F 3/0616* (2013.01); *G06F 3/0643* (2013.01); *G06F 3/0644* (2013.01); *G06F 3/0653* (2013.01); *G06F 3/0673* (2013.01)

(58) Field of Classification Search
None
See application file for complete search history.

(56) References Cited

U.S. PATENT DOCUMENTS 4,467,421 A 8/1984 White
4,607,346 A 8/1986 Hill
5,353,430 A 10/1994 Lautzenheiser (Continued)

FOREIGN PATENT DOCUMENTS

CN 1662886 A 8/2005
CN 1760875 A 4/2006

(Continued)

OTHER PUBLICATIONS

European Office Action received in Application No. 09700908.8 dated Oct. 6, 2011 (10 pages).

(Continued)

*Primary Examiner* — Uyen Le
(74) *Attorney, Agent, or Firm* — Precision IP

(57) ABSTRACT

Techniques for selecting physical storage locations for storing data are provided. A technique involves determining usage statistics associated with a logical block in a file system, selecting a physical storage location, of a plurality of physical storage locations, to assign to the logical block based on (a) at least one attribute associated with the first physical storage location, and (b) the usage statistics associated with the logical block, and causing the logical block to be assigned to the first physical storage location.

48 Claims, 3 Drawing Sheets

(56) References Cited

U.S. PATENT DOCUMENTS

| | | | |
|---|---|---|---|
| 5,379,424 A | 1/1995 | Morimoto et al. | |
| 5,398,142 A | 3/1995 | Davy | |
| 5,475,545 A | 12/1995 | Hampshire | |
| 5,590,300 A | 12/1996 | Lautzenheiser | |
| 5,592,622 A | 1/1997 | Isfeld et al. | |
| 5,594,885 A | 1/1997 | Lautzenheiser | |
| 5,615,353 A | 3/1997 | Lautzenheiser | |
| 5,790,886 A | 8/1998 | Allen | |
| 5,854,941 A | 12/1998 | Ballard et al. | |
| 5,893,139 A | 4/1999 | Kamiyama | |
| 6,023,706 A | 2/2000 | Schmuck et al. | |
| 6,032,224 A * | 2/2000 | Blumenau | 711/117 |
| 6,046,933 A | 4/2000 | Nobukata et al. | |
| 6,098,128 A | 8/2000 | Velez-McCaskey et al. | |
| 6,175,899 B1 | 1/2001 | Baylor et al. | |
| 6,192,481 B1 | 2/2001 | Deenadhayalan et al. | |
| 6,199,150 B1 | 3/2001 | Yoshikawa | |
| 6,256,644 B1 | 7/2001 | Shibayama | |
| 6,378,042 B1 | 4/2002 | Henderson et al. | |
| 6,397,346 B1 | 5/2002 | Cavanaugh et al. | |
| 6,535,891 B1 * | 3/2003 | Fisher et al. | 1/1 |
| 6,605,839 B2 | 8/2003 | Miura et al. | |
| 6,649,542 B2 | 11/2003 | Miura et al. | |
| 6,760,918 B2 | 7/2004 | Rodriguez | |
| 6,848,019 B1 | 1/2005 | Mobley et al. | |
| 6,868,424 B2 | 3/2005 | Jones et al. | |
| 6,904,496 B2 | 6/2005 | Raves et al. | |
| 6,965,989 B1 | 11/2005 | Strange et al. | |
| 7,092,977 B2 | 8/2006 | Leung et al. | |
| 7,191,304 B1 | 3/2007 | Cameron et al. | |
| 7,296,258 B2 | 11/2007 | Beckert et al. | |
| 7,370,068 B1 | 5/2008 | Pham et al. | |
| 7,536,504 B2 | 5/2009 | Kleinschmidt, Jr. et al. | |
| 7,805,571 B2 | 9/2010 | Kirshenbaum et al. | |
| 7,814,554 B1 | 10/2010 | Ragner | |
| 7,870,128 B2 | 1/2011 | Jensen et al. | |
| 7,899,987 B2 | 3/2011 | Salomon et al. | |
| 2001/0013084 A1 | 8/2001 | Barve et al. | |
| 2001/0029512 A1 | 10/2001 | Oshinsky et al. | |
| 2001/0034812 A1 | 10/2001 | Ignatius et al. | |
| 2002/0073290 A1 | 6/2002 | Litvin | |
| 2002/0133746 A1 | 9/2002 | Chen et al. | |
| 2002/0152372 A1 | 10/2002 | Cole et al. | |
| 2002/0191311 A1 * | 12/2002 | Ulrich et al. | 360/1 |
| 2003/0005454 A1 | 1/2003 | Rodriguez | |
| 2003/0076764 A1 | 4/2003 | Iwano et al. | |
| 2003/0086570 A1 | 5/2003 | Riedel et al. | |
| 2003/0121055 A1 | 6/2003 | Kaminski et al. | |
| 2003/0200400 A1 | 10/2003 | Nangle | |
| 2003/0217245 A1 * | 11/2003 | Chase et al. | 711/170 |
| 2003/0221064 A1 | 11/2003 | Honda et al. | |
| 2003/0226059 A1 | 12/2003 | Braun | |
| 2004/0019613 A1 | 1/2004 | Jones et al. | |
| 2004/0059758 A1 * | 3/2004 | Faiman et al. | 707/205 |
| 2005/0060356 A1 | 3/2005 | Saika | |
| 2005/0066139 A1 | 3/2005 | Inoue et al. | |
| 2005/0081009 A1 | 4/2005 | Williams et al. | |
| 2005/0125456 A1 | 6/2005 | Hara et al. | |
| 2005/0165796 A1 | 7/2005 | Moore | |
| 2005/0172074 A1 | 8/2005 | Sinclair | |
| 2005/0240742 A1 | 10/2005 | Eng et al. | |
| 2006/0090031 A1 | 4/2006 | Kirshenbaum et al. | |
| 2006/0112251 A1 * | 5/2006 | Karr et al. | 711/170 |
| 2006/0149890 A1 * | 7/2006 | Gorobets | 711/103 |
| 2006/0274566 A1 * | 12/2006 | Takashima et al. | 365/145 |
| 2006/0274577 A1 | 12/2006 | Pascucci et al. | |
| 2007/0022145 A1 | 1/2007 | Kavuri | |
| 2007/0033362 A1 | 2/2007 | Sinclair | |
| 2007/0033367 A1 * | 2/2007 | Sakarda et al. | 711/170 |
| 2007/0043789 A1 | 2/2007 | Cannon et al. | |
| 2007/0079065 A1 * | 4/2007 | Bonella et al. | 711/113 |
| 2007/0083491 A1 | 4/2007 | Walmsley et al. | |
| 2007/0106864 A1 | 5/2007 | Moore et al. | |
| 2007/0136308 A1 | 6/2007 | Tsirigotis et al. | |
| 2007/0143567 A1 * | 6/2007 | Gorobets | 711/202 |
| 2007/0150891 A1 | 6/2007 | Shapiro | |
| 2007/0156998 A1 * | 7/2007 | Gorobets | 711/170 |
| 2007/0174582 A1 * | 7/2007 | Feldman | 711/202 |
| 2007/0186206 A1 | 8/2007 | Federa et al. | |
| 2008/0016297 A1 | 1/2008 | Bartley et al. | |
| 2008/0027905 A1 | 1/2008 | Jensen et al. | |
| 2008/0028142 A1 | 1/2008 | Kleinschmidt, Jr. et al. | |
| 2009/0132621 A1 | 5/2009 | Jensen et al. | |
| 2009/0138880 A1 | 5/2009 | Yafimau | |
| 2009/0157756 A1 * | 6/2009 | Sanvido | 707/200 |
| 2009/0172275 A1 * | 7/2009 | Nochimowski et al. | 711/114 |
| 2009/0172340 A1 * | 7/2009 | Tang et al. | 711/203 |
| 2011/0087657 A1 | 4/2011 | Jensen et al. | |
| 2011/0167230 A1 | 7/2011 | Quan et al. | |
| 2011/0258186 A1 | 10/2011 | Jensen et al. | |
| 2012/0215949 A1 * | 8/2012 | Chiu et al. | 710/18 |

FOREIGN PATENT DOCUMENTS

| | | |
|---|---|---|
| EP | 0381 651 | 8/1990 |
| JP | 2001-243096 | 9/2001 |
| JP | 2002-073383 | 3/2002 |
| JP | 2005-196725 | 7/2005 |
| TW | 409215 | 10/2000 |
| WO | WO 2004/066277 | 8/2004 |
| WO | WO 2004/109517 | 12/2004 |

OTHER PUBLICATIONS

Current Claims of European Application No. 09700908.8 dated Oct. 2011 (6 pages).

Harding, W.B. et al., "Object Storage Hierarchy Management" IBM Systems Journal, IBM Corp., Armonk, NY, USA. vol. 29, No. 3, XP000265371, Jan. 1, 1990, 14 pages.

Ritchie, B. "Beyond HSM: Data Management in the Native Environment. Integration into the native environment is the key to implementing an effective data management solution" Computer Technology Review, Westworld Production, Beverly Hills, CA USA, vol. 12, No. 11, XP000397478, Sep. 1, 1993, 4 pages.

International Search Report and Written Opinion for International Application No. PCT/US2009/030567, dated Apr. 1, 2009, 17 pages.

Current Claims for International Application No. PCT/US2009/030567, dated Apr. 2009, 8 pages.

Hsu et al., "The Performance Impact of I/Q Optimizations and Disk Improvements", IBMJ. Res.& Dev., Mar. 2004, vol. 48 No. 2, pp. 255-289.

Takihara T., et al., "Optimized Look-Ahead Extension on Sequential Access", IBM Technical Disclosure Bulletin, Nov. 1996, vol. 29, No. 11 pp. 61-62.

Kanamaru M., et al., "Head Hovering to Reduce Seek Time", IBM Technical Disclosure Bulletin, Jun. 1995, vol. 38, No. 06, pp. 301-302.

State Intellectual Property Office of the People's Republic of China, "First Office Action", application No. 200980102072.4, dated May 3, 2012, 12 pages.

Current Claims in application No. 200980102072.4, dated May 2012, 4 pages.

Japanese Office action issued on Mar. 19, 2013 in related Japanese Application No. 2010-542369, 4pp.

Final Rejection Office action mailed Jul. 9, 2013 in corresponding Japanese Patent Application No. 2010-542369, 7pp.

"Notification of Transmittal of the International Search Report and the Written Opinion of the International Searching Authority, or the Declaration" received in International Application No. PCT/US12/20198 dated ,May 3, 2012 (14 pages).

PCT Current Claims in International Application No. PCT/US12/20198 dated May 2012 (2 pages).

Harding, W. et al., "Object Storage Hierarchy Management" *IBM Systems Journal* 1990 (12 pages).

* cited by examiner

SELECTING STORAGE LOCATIONS FOR STORING DATA BASED ON STORAGE LOCATION ATTRIBUTES AND DATA USAGE STATISTICS

CLAIM OF PRIORITY

This application claims priority as a Continuation-In-Part of application Ser. No. 12/349,457 filed on Jan. 6, 2009, which claims priority under 35 U.S.C. §119 to U.S. Provisional Application Ser. No. 61/020,361 filed on Jan. 10, 2008 and also claims priority as a Continuation-In-Part of application Ser. No. 11/495,184 filed on Jul. 28, 2006. This application also claims priority as a Continuation-In-Part of application Ser. No. 12/971,835 filed on Dec. 17, 2010, which claims priority as a Continuation-In-Part of application Ser. No. 11/495,184 filed on Jul. 28, 2006.

INCORPORATION BY REFERENCE

This application hereby incorporates by reference: U.S. application Ser. No. 12/349,457, U.S. application Ser. No. 11/495,184 filed on Jul. 28, 2006, U.S. Provisional Application Ser. No. 61/020,361 filed on Jan. 10, 2008, and U.S. application Ser. No. 12/971,835 filed on Dec. 17, 2010.

FIELD OF THE INVENTION

The present invention relates to selecting physical storage locations. More specifically, the invention relates to selecting physical storage locations for data storage based on storage location attributes and data usage statistics.

BACKGROUND

Data is physically stored at physical storage locations within physical storage media. Examples of the physical storage media include magnetic disks, optical disks, magneto-optical disks, solid state drives, etc. Physical storage media may also include hybrids which are combinations of two or more different types of physical storage media. For example, physical storage media may be implemented as a combination of a solid state drive and a rotating platter drive.

Data physically stored in physical storage media is organized in a disk file maintained by an operating system. A disk file is partitioned into multiple logical blocks, where each logical block is mapped or assigned to physical storage locations within the physical storage media. Data organized within a particular logical block may be accessed by reading or writing to physical storage locations that are assigned to the particular logical block. Data organized within a particular logical block, may be referred to herein, as data logically stored on the particular logical block.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Overview

A method for data positioning is provided. In one or more embodiments, the method involves selecting physical storage locations for storing data logically stored in a logical block of a file system. The selection of the physical storage locations is based on (a) usage statistics for the data and (b) storage location attributes.

In an embodiment, frequently accessed data is stored in physical storage locations with fast access speed, long longevity before failure, and/or storing related data.

Although specific components are recited herein as performing the method steps, in other embodiments agents or mechanisms acting on behalf of the specified components may perform the method steps. Further, although embodiments may be discussed with respect to components on a single system, the embodiments may be implemented with components distributed over multiple systems. In addition, although the embodiments may be discussed with respect to particular physical storage devices or particular physical storage types, embodiments are applicable to any physical storage device or physical storage type (e.g., a rotating disk drive, a solid state drive (SSD), Network Attached Storage (NAS), Storage Area Network (SAN), a hybrid drive etc.).

Embodiments also include any system(s) or device(s) which comprise means for performing the method steps described herein. Embodiments also include a computer readable medium with instructions, which when executed by a processor, cause the method steps described herein to be performed.

System Architecture

Figure 1:
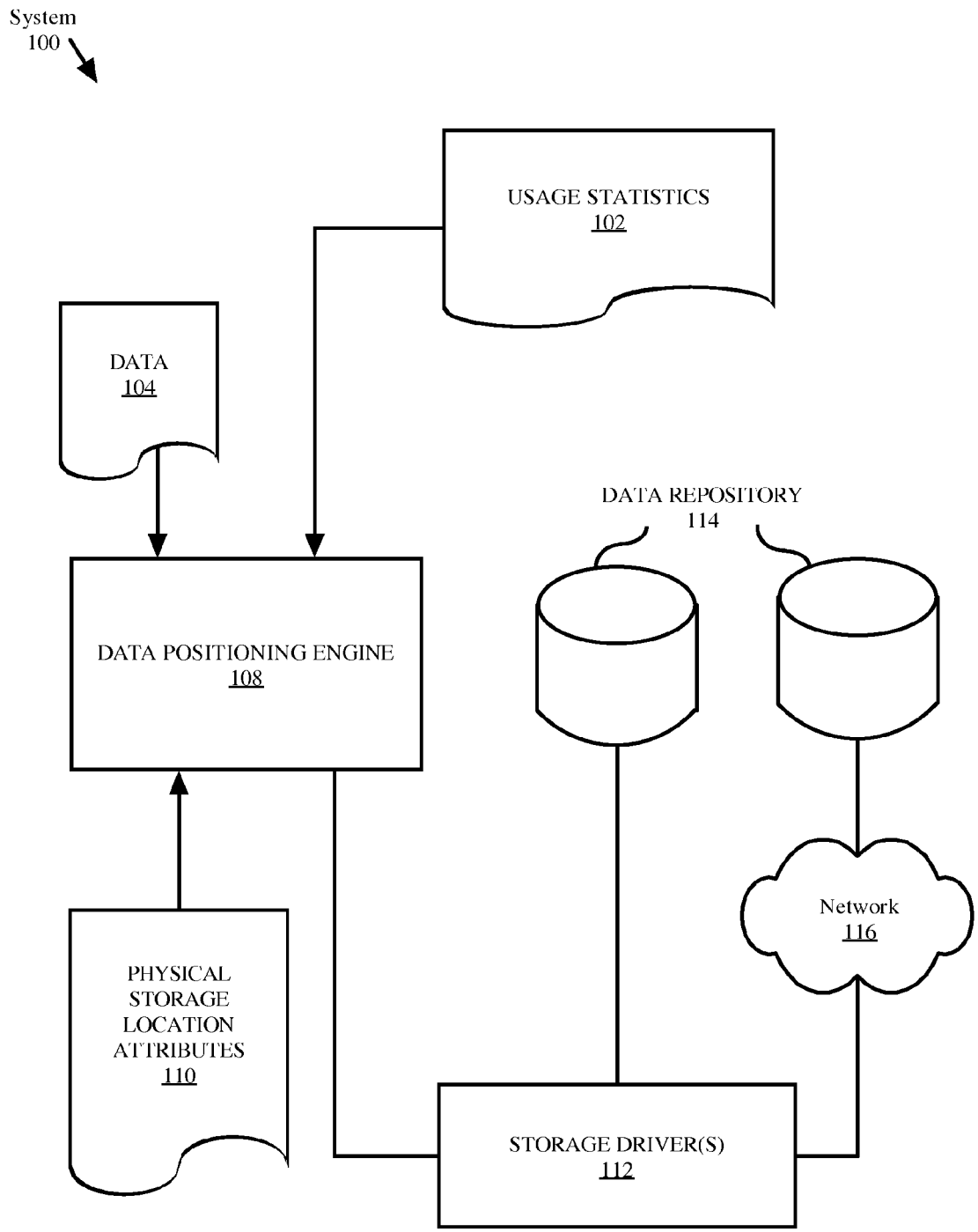
FIG. 1 shows an exemplary system for selecting storage locations in accordance with one or more embodiments.

Although a specific system architecture is described herein, other embodiments are applicable to any architecture that can be used for data positioning. FIG. 1 shows an exemplary system (100) for data positioning in accordance with one or more embodiments. As shown in FIG. 1, the system (100) includes a data positioning engine (108), a storage driver(s) (112), and one or more data repositories (114). The system (100) may also include other hardware and/or software components, which although not shown, may be used for implementation of one or more embodiments. For example, an operating system maintaining a disk file may be communicatively coupled with the data positioning engine (108) or the storage driver(s) (112). Each of these components may be located on the same device or may be located on separate devices coupled by a network (e.g., Internet, Intranet, Extranet, Local Area Network (LAN), Wide Area Network (WAN), etc.), with wired and/or wireless segments or on separate devices coupled in other means. In an embodiment, the system (100) may be configured differently. For example, data positioning engine (108) may be logically located between the storage driver (112) and the data repository (114). In another example, the data positioning engine (108) may be implemented as a component of the storage driver (112).

In one or more embodiments, the system (100) is implemented using a client-server topology. In addition, the system may be accessible from other machines using one or more interfaces. In one or more embodiments, the system may be accessible over a network connection, such as the Internet, by one or more users. Information and/or services provided by the system may also be stored and accessed over the network connection.

The Data Repository

The data repository (114) generally represents physical storage media comprising one or more storage devices with physical storage locations where data (104) may be stored. Portions of the data repository (114) may be connected directly to the system (100), may be connected over a network (116), or other suitable interfaces. The data repository (114) may include any type of storage devices known in the art. For example, the data repository (114) may include caches, Random-Access Memory (RAM), secondary storage devices, traditional rotating platter drives, solid state drives (SSDs), a hybrid combination of the traditional rotating platter drives and SSDs, a separate storage system like a Storage Area Network (SAN) or a Network Attached Storage (NAS) device.

In an embodiment, each storage device within the data repository (114) may include different types of storage locations. For example, an SSD within the data repository (114) may include different cells, such as, single level cells (SLCs), multi-level cells (MLCs), or a combination thereof. Thus, the physical storage locations within the data repository (114) that are available for storage to the system (100) may be on a single storage device or multiple storage device with varying configurations across different storage devices or even within a single storage device.

Physical Storage Location Attributes

In an embodiment, the physical storage locations and/or data storage devices within the data repository (114) may vary in physical storage location attributes (110). Examples of physical storage location attributes include sequential write speed, sequential read speed, random write speed, random read speed, longevity, input/output operations per second (IOPS), etc. The longevity of a physical storage location or data storage device generally represents the estimated lifetime of the physical storage location or the data storage device before failure. For example, the longevity of a physical storage location or data storage device may be dependent on the estimated number of writes that can be performed before failure (hereinafter referred to as "number-of-writes-before-failure") or the estimated number of reads that can be performed before failure (hereinafter referred to as "number-of-reads-before-failure"). The number-of-writes-before-failure and/or the number-of-reads-before-failure may be estimated, for example, based on statistics based on use of similar devices. The estimated number-of-writes-before-failure and the estimated number-of-reads-before-failure may be received from a manufacturer or other source. The estimated number-of-writes-before-failure and the estimated number-of-reads-before-failure may include exact information. For example, a physical storage location, a region of physical storage locations, or a device may be programmed to fail after a particular number of reads and/or writes. The estimates may be specific numbers or may be virtually limitless. For example, a storage device may allow for a virtually limitless number of reads without failure. The longevity of a physical storage location may be a value computed based on a combination of an estimated number-of-reads-before-failure and an estimated number-of-writes-before-failure.

In an embodiment, an estimated longevity of a physical storage location or a data storage device may be a length of time for use of the physical storage location or data storage device. The longevity of a physical storage location or storage device may vary based on any factor (e.g., manufacturer, age, operating environment, etc.). Further, the physical storage location attributes (110) may include the historical usage of a particular physical storage location or a particular storage device. The actual usage of the physical storage location generally represents the number of times a physical storage location has been accessed (e.g., the number of times the physical storage location has been written to or read from), the amount of time the data storage device has been in use, etc.

In an embodiment, physical storage location attributes for a physical storage location may include the data already stored at the physical storage location. For example, data stored within a particular physical memory block that is loaded into Random-Access Memory (RAM) from a secondary storage device (e.g., a rotating platter drive) may include data logically stored in related logical blocks. In an embodiment, a selection procedure for selecting physical storage locations for data may consider other data already stored at the physical storage locations.

In an embodiment, storing related data at the same physical storage location (e.g., within the same physical memory block or within the same set of physical memory blocks) may improve performance. For example, reading related data within a single physical memory block may involve loading the single physical memory block secondary storage into RAM. Reading related data in multiple physical memory blocks may involve loading multiple physical memory blocks from secondary storage into RAM.

Logical Blocks

In an embodiment, logical blocks are partitions within a disk file used for organization of data (104). A logical block may include any amount of data. In an embodiment, a logical block is a page that can be individually referred to and loaded from a secondary storage device.

In an embodiment, data organized within a particular logical block, may be referred to herein, as data logically stored on that particular logical block. Accessing a logical block, as referred to herein, includes accessing any data that is logically stored within that logical block. Data logically stored within a logical block is physically stored at a physical storage location that is assigned to that logical block.

In an embodiment, an operating system may access data (104) stored in data repository (114) by referring to the logical block which logically stores the data (104). Based on a mapping from the disk file to physical storage media, the physical storage location assigned to the logical block may be identified. For example, a table may indicate the address of the physical storage location for the logical block. In another example, an offset may be added to the address of a logical block to obtain the address of the physical memory location mapped to that logical block. Once the address of the physical memory location is determined, data may be read or written to the physical memory location.

Usage Statistics

In an embodiment, usage statistics (102) are associated with logical blocks. The usage statistics (102) associated with a particular logical block include statistics related to any data logically stored within that particular logical block.

In an embodiment, usage statistics for a particular logical block include a frequency of access to the particular logical block. For example, usage statistics may include a frequency of write access associated with the particular logical block. The frequency of write access associated with a particular logical block may be computed by tallying all write accesses to any data logically stored within that particular logical block. The frequency of write access associated with a particular logical block may be computed by averaging a number of write accesses to any data logically stored within that particular logical block per period of time. The frequency of write access associated with a particular logical block may be computed based on a number of write accesses to any data logically stored within that particular logical block relative to a total number of write accesses.

A frequency of read accesses may also be computed using similar example computation techniques. In an embodiment, a frequency of access may be based on a combination of a frequency of write accesses and a frequency of read accesses.

In an embodiment, usage statistics for a particular logical block include the timing of access to any data logically stored within the particular logical block. For example, access to any data logically stored within the particular logical block may be before or after an event (e.g., system startup, system shutdown, system suspend, system hibernate, system resume), daily, weekly, immediately after creation of data, etc.

Data Positioning Engine

In an embodiment, the data positioning engine (108) within the system (100) generally represents software and/or hardware that includes logic to select physical storage locations for storing data.

In an embodiment, selecting physical storage locations, as referred to herein, may include selecting a physical storage location type or a physical storage location attribute. The selected physical storage locations include any physical storage locations of the physical storage location type or with the physical storage location attribute. For example, selecting a physical storage location may include selecting a solid state drive portion of a hybrid drive which includes the solid state drive and a rotating platter drive. Another example involves selecting a particular region of a rotating platter drive from a plurality of regions on the rotating platter drive. Another example involves selecting a minimum write speed and selecting any physical storage locations (e.g., regions or devices) with at least the minimum write speed.

In an embodiment, selecting physical storage locations, as referred to herein, may include selecting physical addresses of physical storage locations to store data logically stored in a particular logical block.

In an embodiment, the data positioning engine (108) may be an application running on one or more servers, and in some embodiments could be a peer-to-peer application, or resident upon a single computing system (e.g., a personal computer, a hand-held device, a kiosk, a computer onboard a vehicle, or any other system with storage devices).

In an embodiment, the data positioning engine (108) may be implemented in the system (100) as a component of the storage driver (112). In an embodiment, the data positioning engine (108) may be implemented in the system (100) between an operating system (not shown) and the storage driver (112). In an embodiment, the data positioning engine (108) may be positioned in the system (100) between the storage driver (112) and the data repository (114).

In an embodiment, the data positioning engine (108) may overwrite selections of physical storage locations made by the storage driver (112). For example, the data positioning engine (108) may receive a selection of physical storage locations from the storage driver to store data logically stored in a particular logical block. The data positioning engine (108) may select alternate physical storage locations in accordance with one or more embodiments and store the data at the alternate physical storage locations.

In an embodiment, the data positioning engine (108) may identify a set of consecutive physical storage locations for storing data logically stored in the particular logical block. The data positioning engine (108) may identify a set of physical storage locations by identifying a starting physical storage location address and/or an ending physical storage location address.

In an embodiment, the data positioning engine (108) may be configured to identify a physical storage device in the data repository (114) for storing the data (104) (e.g., if more than one storage device is available). The data positioning engine (108) may also be configured to select a region or a specific storage location address within the data repository (114) to store the data (104).

The Storage Driver

In an embodiment, the storage driver(s) (112) retrieves and stores data (104) from the data repository (114) based on a set of instructions received directly or indirectly from the data positioning engine (108).

In an embodiment, the storage driver(s) (112) receives a physical storage location type or a physical storage location attribute identified by the data positioning engine (108). The storage driver (112) then selects an address of a physical storage location that matches the physical storage location type or the physical storage location attribute for storing the data (104).

In an embodiment, the data positioning engine (108) may provide data (104) and specify a physical storage location for storing the data in physical storage media. The physical storage location received by the storage driver (112) may include the storage device, a region of the storage device, a logical storage location address, or a physical storage location address. In an embodiment, the storage driver (112) may determine the physical storage location address based on available physical storage locations within a specified region or within a specified device.

In an embodiment, the data storage driver (112) sends the data and information identifying the physical storage location to the data positioning engine (108) for storage of the data by the data positioning engine (108).

Figure 2:
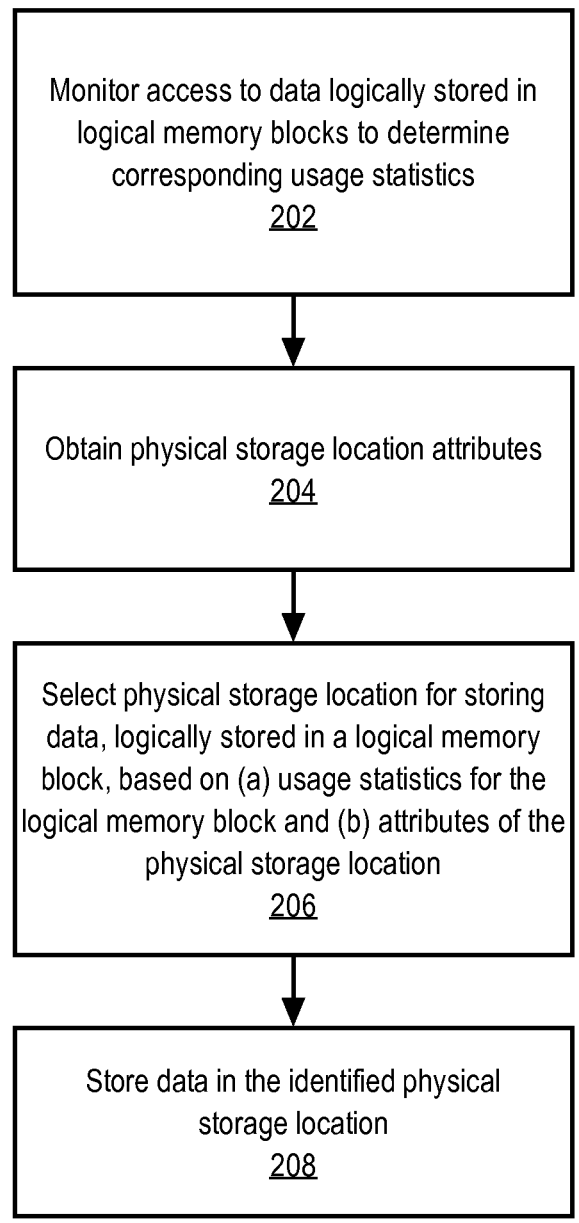
FIG. 2 shows a flow diagram for data positioning in accordance with one or more embodiments.

Selecting a Storage Location Based on Usage Statistics Associated with a Logical Block and Storage Location Attributes FIG. 2 shows a flow chart for data positioning in accordance with one or more embodiments. In one or more embodiments, one or more of the steps described below may be omitted, repeated, and/or performed in a different order. Accordingly, the specific arrangement of steps shown in FIG. 2 should not be construed as limiting the scope of the invention.

In an embodiment, access to data logically stored in the particular logical block is monitored to determine usage statistics for the particular logical block (Step 202). Access to data logically stored in the particular logical block may be monitored at one or more different system levels. For example, access to data may be monitored at the application level, operating system level, storage driver level, or hardware level.

In an embodiment, file requests may be monitored at the operating system level. For example, for each file request received by an operating system, a corresponding logical block of a disk file is identified. Information indicating a type of access, a time of access, and the logical block may be recorded.

In an embodiment, access to data may be monitored at the storage driver level. For example, requests to determine physical storage location addresses (e.g., by pointers, by mapping, by computation, etc.) based on logical blocks may be monitored. The logical blocks within the requests may be recorded.

In an embodiment, access to data may be monitored at the hardware level. For example, physical memory locations may be monitored for read access or write access. Each time data is read from a physical storage address or written to a physical storage address, the corresponding logical block to which the physical storage address is assigned may be determined and recorded.

Access to data logically stored in a logical block may be monitored at other levels (e.g., a level between an operating system and a storage driver or a level between a storage driver and physical memory).

In an embodiment, any logged information may be aggregated as usage statistics (e.g., the frequency of access, the type of access, the time of access, etc.). Usage statistics may include patterns identified in logged information. For example, a pattern may indicate that data logically stored in a particular logical block is read daily at 9 am.

In an embodiment, a time of access of data may be related to an event (e.g., system shutdown, system startup, system hibernate, system suspend, system resume, etc.). For example, a usage statistic may include a pattern of reading data logically stored in a particular logical block during a system startup and of writing data logically stored in the particular logical block during a system shutdown may be identified. Patterns may be related to data access before, after, or during events. For example, an event may include a particular system state. During the time when the system is in the particular system state, data logically stored in certain logical blocks may be continuously read.

In an embodiment, information associated with physical storage location attributes for available physical storage locations is obtained (Step 204). The information associated with physical storage location attributes may be provided by a manufacturer of the storage devices (or by another entity). For example, the physical storage location attributes may be provided on a solid state drive (SSD) sold with the storage device. The physical storage location attributes of the storage device may also be stored onto the storage device itself, so that the physical storage location attributes may be read from the storage device by a system accessing the storage device.

In an embodiment, tests may be performed on the storage devices to determine the attributes of different physical storage locations within the storage devices. For example, a sequence of reads and/or writes may be performed on different regions of a traditional rotating platter drive to determine read and/or write speeds of the different regions within the rotating platter drive. Another example involves testing the read and write speeds of single level cells in a SSD and multi-level cells within the same SSD. The testing may indicate that single level cells are faster. Another example, may involve tracking the number of times a physical storage location or set of physical storage locations are accessed before failure to determine a longevity associated specifically with physical storage locations or with a storage device as a whole.

In an embodiment, a physical storage location is selected for storing data, logically stored in a particular logical block, based on (a) usage statistics for the particular logical block and (b) attributes of the physical storage location (Step 206).

In an embodiment, a physical storage location with a high read and/or write access speed is selected for storing data logically stored in a logical block that is associated with a high access frequency. Further, a physical storage location with a low read and/or write access speed is selected for storing data logically stored in a logical block that is associated with a low access frequency.

In an embodiment, a physical storage location with a long longevity is selected for storing data logically stored in a logical block that is associated with a high access frequency. Further, a physical storage location with a short longevity is selected for storing data logically stored in a logical block that is associated with a low access frequency.

In an embodiment, the data, logically stored in a logical block, may be stored at a high speed storage location in response to determining that the data is expected to be read within a particular time window from the storing of the data. A physical storage location may be selected for storing data, logically stored in a logical block, based on a time or event at which the data is being stored. For example, if usage statistics indicate that data logically stored in a particular logical block is read daily at 9 am and the data is being stored between 7 am and 9 am, then the data may be stored at a physical storage location with a high read speed.

In an embodiment, different types of usage statistics (e.g., frequency of access, type of access, time of access, etc.) and/or different types of storage location attributes (e.g., speed, longevity, etc.) may be evaluated in combination to determine a physical storage location for storing data logically stored in a particular logical block. For example, particular data, logically stored in the particular logical block, may be frequently read but not frequently written. A physical storage location with a high read speed and a high estimated number-of-reads-before-failure may be selected for storing the particular data. The physical storage location may be selected even if the physical storage location has a low write speed or a low estimated number-of-writes-before-failure.

In an embodiment, the selection of physical storage locations is based on comparison of all available storage locations. For example, of the available storage locations, the top quartile of fastest or longest lasting storage locations is matched with the top quartile of data that are accessed most frequently.

Another example involves the concurrent use of traditional platter drives and solid state drives. Traditional platter drives generally tend to have a very high longevity or estimated lifetime. Traditional platter drives, however, tend to be slow. In comparison, solid state drives generally have a low longevity, but offer higher read/write speeds than traditional platter drives. In an example, a background process may continually write to a data set (e.g., a log file), logically stored in a particular logical block, and may rarely read the data. In this case, a determination may be made that the write speed for data, logically stored in the particular logical block, is not important on the basis that a low priority background process is requesting the write. The determination may be made on the basis that read access is rarely requested even though write access is frequently requested. A traditional platter drive with a low write speed may be suitable as the traditional platter drive would allow for a very large number of writes without failure and the write speed is not important. A solid state drive may not suitable in this example as the solid state drive is more likely to fail with continual writing and the high write speed of the solid state drive would be unnecessary.

Once a suitable physical storage location for storage of the data is selected, the data is stored at the selected physical storage location (Step 208). Storing the data at the physical storage location may involve instructing a storage driver to store the data any physical storage location that matches a particular storage location attribute (e.g., a minimum longevity).

In an embodiment, storing the data at the physical storage location may involve instructing a storage driver to store the data at any physical storage location within a particular region of memory. For example, a particular storage device or a particular region within a storage device may be selected. The storage driver may then select a specific address of a physical storage location for storing data.

In an embodiment, storing the data at the physical storage location may involve instructing the storage driver to store the data at a particular address of a physical storage location.

Duplicating Data Storage

In an embodiment, duplicate copies of data may be stored at multiple physical storage locations (e.g., multiple different devices and/or multiple regions of a single device). For example, data logically stored in a logical block of a disk file may be concurrently stored on a rotating platter drive and a solid state drive.

In an example, data may be requested from a first data source such as a rotating platter drive. In response to the request, a determination is made that the requested data is also stored on a solid state drive. The data may be read from the solid state drive instead of the rotating platter drive. A new data source may be selected instead of the requested data source because of one or more factors. For example, reading data from a solid state drive may be faster than reading data from a rotating platter drive. In another example involving continuous read requests, a rotating platter drive may be selected as a data source instead of a requested solid state drive due to the longevity of the rotating platter drive.

In an embodiment, the particular physical storage location may be selected based on a current use of the system. For example, multiple storage devices which store the requested data may be evaluated to determine a current utilization or a current input/output request queue. A storage device with a lowest current use or greatest current availability may be selected as a data source for retrieving the data. In an example, one of the storage devices with the data may already be scheduled for an upcoming computer job while another storage device may be available.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
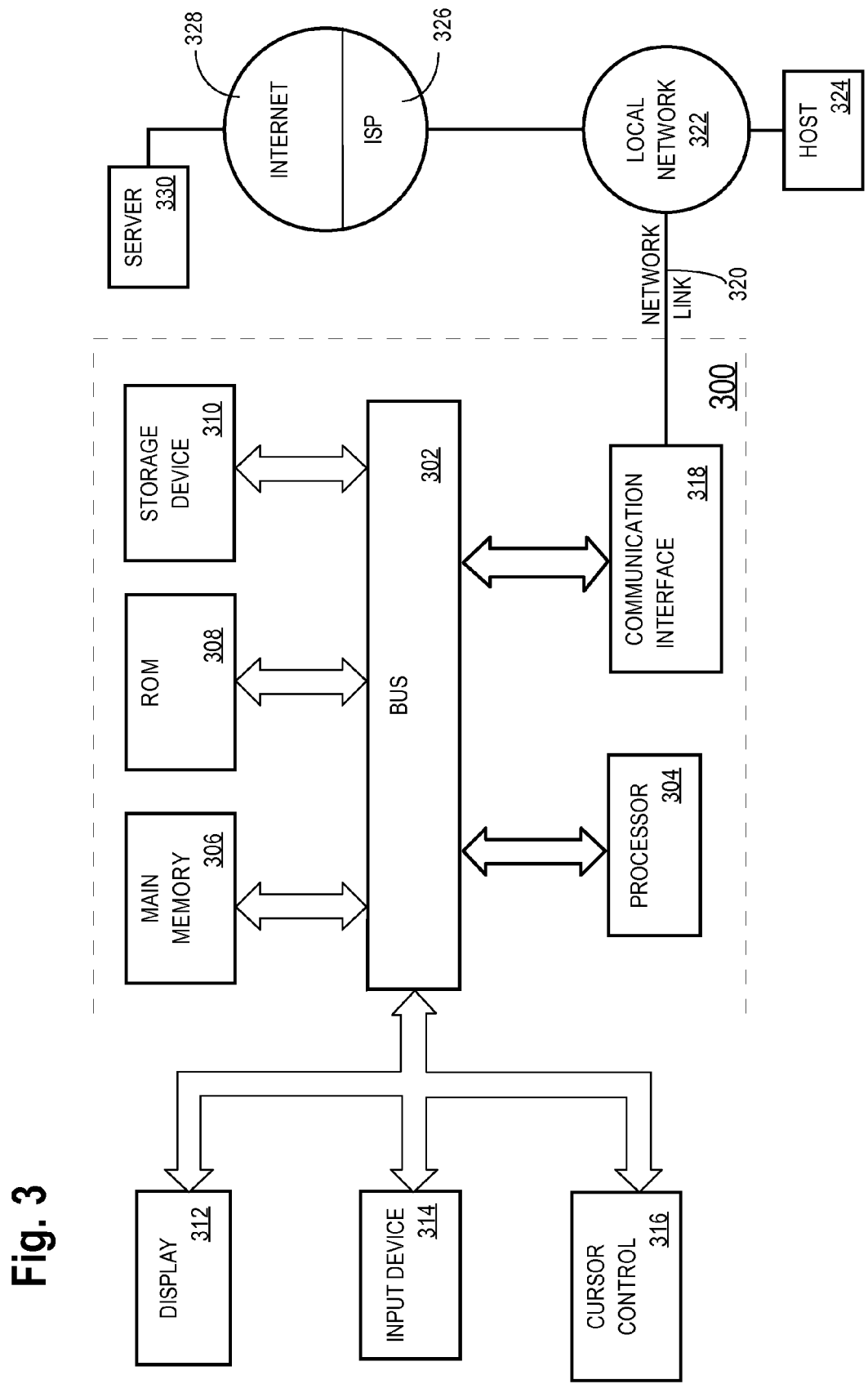
FIG. 3 shows a block diagram of a computer system that may be used in implementing one or more embodiments.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computer-implemented method comprising:
   determining separate usage statistics associated with each logical block of a plurality of logical blocks of a file in a file system, wherein the usage statistics associated with one or more logical blocks includes a time of data access of said one or more logical blocks related to an external event;
   selecting a first physical storage location, of a plurality of physical storage locations, to assign to a logical block based on at least one attribute associated with the first physical storage location, and the usage statistics associated with the logical block; and
   causing the logical block to be assigned to the first physical storage location.

2. The method as recited in claim 1, further comprising:
   receiving a request to read data logically stored in the logical block, wherein the data is stored at the first physical storage location and at a second physical storage location; and
   reading the data from the first physical storage location based at least on a particular attribute associated with the first physical storage location.

3. The method as recited in claim 1, further comprising:
   receiving a request to read data stored at a second physical storage location;
   determining that the data is also stored at the first physical storage location; and
   reading the data from the first physical storage location based at least on a particular attribute associated with the first physical storage location.

4. The method as recited in claim 3, wherein the particular attribute is a current utilization of the first physical storage location.

5. The method as recited in claim 1, wherein determining usage statistics comprises monitoring access to any data logically stored in the logical block to determine access information, and aggregating the access information.

6. The method as recited in claim 5, wherein determining usage statistics further comprises identifying repeated patterns in the aggregated information.

7. The method as recited in claim 1, wherein determining usage statistics comprises monitoring data access requests, from an operating system, which refer to the logical block including a type of access and a time of access.

8. The method as recited in claim 1, wherein the usage statistics comprise one or more of:
   a read frequency associated with any data logically stored in the logical block;
   a write frequency associated with any data logically stored in the logical block; and
   an access timing associated with any data logically stored in the logical block.

9. The method as recited in claim 1, wherein the data, logically stored in a logical block, is a smallest unit of memory that can be individually requested from a secondary storage device.

10. The method as recited in claim 1, wherein selecting the first physical storage location comprises selecting consecutive physical memory space for storing data logically stored in the logical memory block.

11. The method as recited in claim 1, wherein the at least one attribute comprises a read access speed or a write access speed of the first physical storage location.

12. The method as recited in claim 1, wherein the external event at least one attribute comprises one or more of a system shutdown, a system startup, a system hibernate, a system suspend, and a system resume.

13. The method as recited in claim 1, wherein the at least one attribute comprises an estimated number of write-accesses-before-failure for the first physical storage location.

14. The method as recited in claim 1, wherein the at least one attribute comprises an estimated number of read-accesses-before-failure for the first physical storage location.

15. The method as recited in claim 1, wherein the at least one attribute comprises attributes of data already stored at the first physical storage location before the first physical storage location is selected.

16. The method as recited in claim 1, wherein causing the logical block to be assigned to the first physical storage location comprises:
   mapping the logical block to the first physical storage location in a mapping of a plurality of logical blocks to the plurality of physical storage locations.

17. A non-transitory computer readable storage medium comprising instructions, which when executed by one or more processors, perform steps comprising:
   determining separate usage statistics associated with each logical block of a plurality of logical blocks of a file in a file system, wherein the usage statistics associated with one or more logical blocks includes a time of data access of said one or more logical blocks related to an external event;
   selecting a first physical storage location, of a plurality of physical storage locations, to assign to a logical block based on at least one attribute associated with the first physical storage location, and the usage statistics associated with the logical block; and
   causing the logical block to be assigned to the first physical storage location.

18. The computer readable storage medium as recited in claim 17, further comprising instructions for performing:
   receiving a request to read data logically stored in the logical block, wherein the data is stored at the first physical storage location and at a second physical storage location; and
   reading the data from the first physical storage location based at least on a particular attribute associated with the first physical storage location.

19. The computer readable storage medium as recited in claim 17, further comprising instructions for performing:
   receiving a request to read data stored at a second physical storage location;
   determining that the data is also stored at the first physical storage location; and
   reading the data from the first physical storage location based at least on a particular attribute associated with the first physical storage location.

20. The computer readable storage medium as recited in claim 19, wherein the particular attribute is a current utilization of the first physical storage location.

21. The computer readable storage medium as recited in claim 17, wherein determining usage statistics comprises monitoring access to any data logically stored in the logical block to determine access information, and aggregating the access information.

22. The computer readable storage medium as recited in claim 21, wherein determining usage statistics further comprises identifying repeated patterns in the aggregated information.

23. The computer readable storage medium as recited in claim 17, wherein determining usage statistics comprises monitoring data access requests, from an operating system, which refer to the logical block.

24. The computer readable storage medium as recited in claim 17, wherein the usage statistics comprise one or more of:
   a read frequency associated with any data logically stored in the logical block;
   a write frequency associated with any data logically stored in the logical block; and
   an access timing associated with any data logically stored in the logical block.

25. The computer readable storage medium as recited in claim 17, wherein the data, logically stored in a logical block, is a smallest unit of memory that can be individually requested from a secondary storage device.

26. The computer readable storage medium as recited in claim 17, wherein selecting the first physical storage location comprises selecting consecutive physical memory space for storing data logically stored in the logical block.

27. The computer readable storage medium as recited in claim 17, wherein the at least one attribute comprises a read access speed of the first physical storage location.

28. The computer readable storage medium as recited in claim 17, wherein the at least one attribute comprises a write access speed of the first physical storage location.

29. The computer readable storage medium as recited in claim 17, wherein the at least one attribute comprises an estimated number of write-accesses-before-failure for the first physical storage location.

30. The computer readable storage medium as recited in claim 17, wherein the at least one attribute comprises an estimated number of read-accesses-before-failure for the first physical storage location.

31. The computer readable storage medium as recited in claim 17, wherein the at least one attribute comprises attributes of data already stored at the first physical storage location before the first physical storage location is selected.

32. The computer readable storage medium as recited in claim 17, wherein causing the logical block to be assigned to the first physical storage location comprises:
  mapping the logical block to the first physical storage location in a mapping of a plurality of logical blocks to the plurality of physical storage locations.

33. A system comprising:
  at least one hardware processor;
  the system being configured to perform operations comprising:
    determining separate usage statistics associated with each logical block of a plurality of logical blocks of a file in a file system, wherein the usage statistics associated with one or more logical blocks includes a time of data access of said one or more logical blocks related to an external event;
    selecting a first physical storage location, of a plurality of physical storage locations, to assign to a logical block based on at least one attribute associated with the first physical storage location, and the usage statistics associated with the logical block; and
    causing the logical block to be assigned to the first physical storage location.

34. The system as recited in claim 33, wherein the operations further comprise:
  receiving a request to read data logically stored in the logical block, wherein the data is stored at the first physical storage location and at a second physical storage location; and
  reading the data from the first physical storage location based at least on a particular attribute associated with the first physical storage location.

35. The system as recited in claim 33, wherein the operations further comprise:
  receiving a request to read data stored at a second physical storage location;
  determining that the data is also stored at the first physical storage location; and
  reading the data from the first physical storage location based at least on a particular attribute associated with the first physical storage location.

36. The system as recited in claim 35, wherein the particular attribute is a current utilization of the first physical storage location.

37. The system as recited in claim 33, wherein determining usage statistics comprises monitoring access to any data logically stored in the logical block to determine access information, and aggregating the access information.

38. The system as recited in claim 37, wherein determining usage statistics further comprises identifying repeated patterns in the aggregated information.

39. The system as recited in claim 33, wherein determining usage statistics comprises monitoring data access requests, from an operating system, which refer to the logical block.

40. The system as recited in claim 33, wherein the usage statistics comprise one or more of:
  a read frequency associated with any data logically stored in the logical block;
  a write frequency associated with any data logically stored in the logical block; and
  an access timing associated with any data logically stored in the logical block.

41. The system as recited in claim 33, wherein the data, logically stored in a logical block, is a smallest unit of memory that can be individually requested from a secondary storage device.

42. The system as recited in claim 33, wherein selecting the first physical storage location comprises selecting consecutive physical memory space for storing data logically stored in the logical block.

43. The system as recited in claim 33, wherein the at least one attribute comprises a read access speed of the first physical storage location.

44. The system as recited in claim 33, wherein the at least one attribute comprises a write access speed of the first physical storage location.

45. The system as recited in claim 33, wherein the at least one attribute comprises an estimated number of write-accesses-before-failure for the first physical storage location.

46. The system as recited in claim 33, wherein the at least one attribute comprises an estimated number of read-accesses-before-failure for the first physical storage location.

47. The system as recited in claim 33, wherein the at least one attribute comprises attributes of data already stored at the first physical storage location before the first physical storage location is selected.

48. The system as recited in claim 33, wherein causing the logical block to be assigned to the first physical storage location comprises:
  mapping the logical block to the first physical storage location in a mapping of a plurality of logical blocks to the plurality of physical storage locations.

* * * * *